Aug. 6, 1963 W. W. WARDRUP 3,100,083
WATER SPRINKLER VALVE
Filed May 15, 1961

INVENTOR.
WILLIS W. WARDRUP
BY
Munn & Liddy

United States Patent Office 3,100,083
Patented Aug. 6, 1963

3,100,083
WATER SPRINKLER VALVE
Willis W. Wardrup, 482 Mariposa Ave.,
Mountain View, Calif.
Filed May 15, 1961, Ser. No. 125,604
2 Claims. (Cl. 239—452)

The present invention relates to water sprinkler valves and it consists of the combinations, constructions and arrangements hereinafter described and claimed.

An object of my invention is to provide a water sprinkler valve especially designed to be used for sprinkling roads and the like and in which the valve body is in the form of a disc that can close the outlet end of a vertically disposed water pipe. The same disc valve can be opened to the desired extent to control the amount of water issuing from the pipe and the flat disc form of the valve will act as a water spreader for causing the water to issue from the pipe in an apron-like manner. I provide an air chamber with a diaphragm that is connected to the valve and the amount of air in the chamber and under pressure, controls the extent to which the disc valve will open. The water pressure in the outlet pipe urges the disc valve into open position. The air chamber is disposed directly above the disc valve and the support between the water pipe and the air chamber serves the additional function of controlling the angular area covered by the apron-like stream of water issuing from between the outlet end of the water pipe and the under surface of the disc valve.

A further object of my invention is to provide a device of the type described which is simple in construction and is durable and efficient for the purpose intended.

Other objects and advantages will appear as the specification continues. The novel features of the invention will be set forth in the appended claims.

Drawing

For a better understanding of my invention, reference should be had to the accompanying drawing, forming part of this specification, in which:

FIGURE 1 is a vertical section through the device and is shown connected to a water conduit; and FIGURE 2 is a horizontal section taken along the line II—II of FIGURE 1.

While I have shown only the preferred form of my invention, it should be understood that various changes, or modifications, may be made within the scope of the annexed claims without departing from the spirit thereof.

Detailed Description

Figure 2:
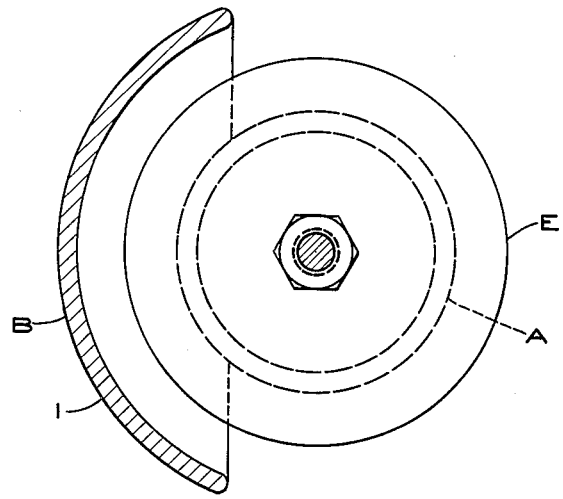
Figure 1:
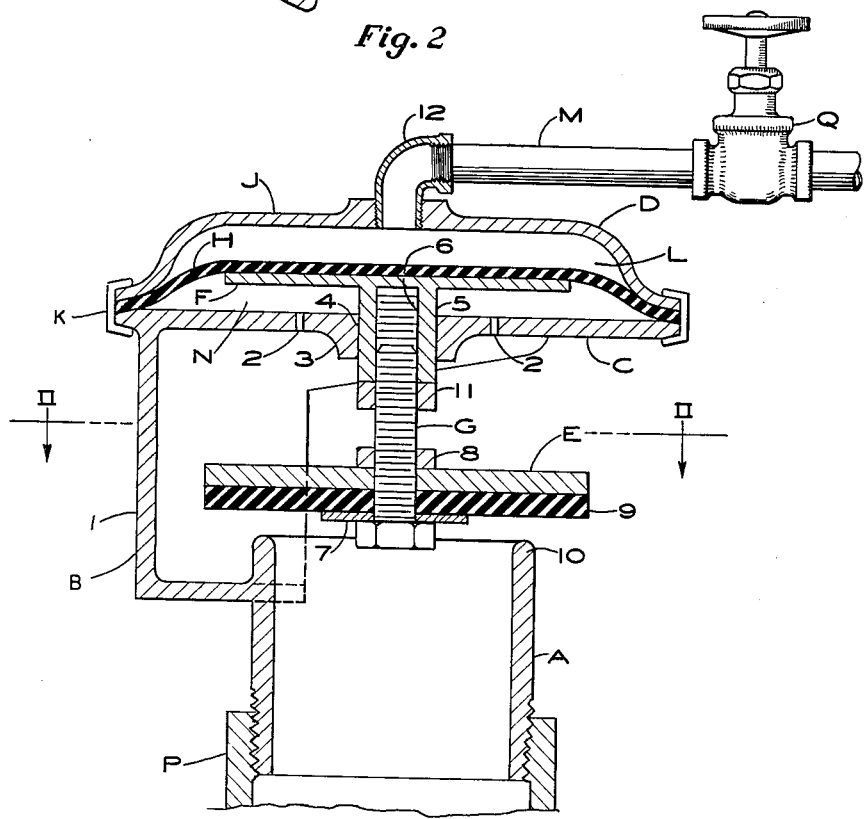

In carrying out my invention I provide a casting which comprises a water pipe A, a support B which is arcuate in horizontal cross section, see FIGURE 2, and a circular member C, that forms the bottom to an air control device indicated generally at D. The arcuate portion of the support B is shown as being slightly less than a half circle. This means that water flowing from the pipe A, and striking the under surface of an opened disc valve E, will be formed into an apron-like stream and the arcuate portion 1 of the support G, will prevent the stream from flowing to the left in FIGURE 2. Therefore the stream of water will issue to the right and will extend over an arc of slightly more than 180°. It is possible to reduce the vertical portion of the support to one or two vertical rod-like members, not shown, so that an apron-like stream of water of substantially 360° or a complete circle can issue from the water pipe A, and be spread by the undersurface of the disc valve E. It is also possible to increase the size of the arcuate portion 1 so that the angle of spread of the apron-like stream of water can be reduced to any size of angle desired.

The bottom member C, for the air control device D, has vent openings 2 therein and it also has a centrally disposed, downwardly extending boss 3, and this boss has a bore 4, whose axis is aligned with the longitudinal axis of the water pipe A, and with the center of the disc valve E. A disc-shaped header F, has a cylindrical member 5, that depends therefrom and is slidably received in the cylindrical bore 4. The cylindrical member 5, has a threaded bore 6, whose axis is aligned with the axis of the water pipe A. A cap screw G, has its shank extending through a washer 7, and through a central opening provided in the disc valve E. A nut 8, is threaded onto the shank of the cap screw G, and bears against the top of the disc valve E.

The undersurface of the disc valve E, has a layer of neoprene 9, or other resilient material, and this layer contacts with the rounded upper edge 10 of the water pipe A, for shutting off the flow of water through the pipe when the disc valve E, is moved downwardly into closed position. The threaded shank of the cap screw G, is screwed into the threaded bore 6 of the cylindrical member 5, and a lock nut 11, on the cap screw shank can be moved against the lower end of the member 5 to secure the cap screw in adjusted position. The adjustment is such that the disc valve E will close the outlet end 10, of the water pipe A, before the disc head F, will come to rest on the upper surface of the bottom member C.

A circular diaphragm H, overlies the disc head F, and has its periphery contacting with the periphery of the bottom member C. The rim of the bottom member has a double chamfer on its upper and lower surfaces. A cover J has a rim of the same diameter as the rim of the bottom member C, and the cover rim bears against the circular edge of the diaphragm H. The upper surface of the cover J is chamfered adjacent to the periphery of the cover and a split clamping ring K, encircles the rims of the bottom member C, diaphragm H, and cover J, to provide an air-tight compartment L, in the air-control device D. An air inlet and exhaust pipe M, communicates with an elbow 12, that in turn communicates with the compartment L, and is carried by the cover J.

The air pipe M, leads to an air control valve Q, which can be operated for connecting the compartment L, with a source of air under pressure, not shown. The pressure of the water in the water pipe A, may be about 100 pounds p.s.i. and this will open the disc valve E, if there is not sufficient counteracting air pressure in the air line M. A 100 pounds of pressure in the air line M, when the valve Q is opened and connects the line M, with a source of air under pressure, will press downwardly on the larger diaphragm H, with a force of about 900 pounds p.s.i. This is ample force to close the disc valve E, against the 100 pounds of water pressure.

The operator can move the air valve Q for bleeding off some of the air through the air line M, and to reduce the air pressure in the compartment L, and permit the water pressure in the pipe A, to start opening the disc valve. The air valve Q can be closed to stop any further air escape from the compartment L, and the water valve E, can be held to any desired degree of opening up to full open position. The flow of water from the pipe A, can be controlled in this manner. The valve Q may be of any well known type such as shown in Patent 1,496,391 of June 3, 1924, to B. B. Thomas. The valve 24 shown in said patent is actuated by a handle 25 to establish communication between the branch lines 20 and 21 through the ports 26 and 27 of said valve member in order to deliver a fluid medium to the piston head 16. The valve 24 is capable of bleeding a portion or all of the fluid medium from the piston head through the actuation of the valve handle 25 in order to align the ports 28 and 27 with the branch line 21 and vent 29 so that the fluid medium so delivered to the piston head 16 can be bled off to permit actuation of said piston. The cap screw G, can be adjusted in the threaded bore 6, to alter the distance between the disc header F and the disc valve E, and then the lock nut 11, can be tightened against the lower end of the cylindrical member 5, to prevent any accidental movement of the cap screw. The air vents 2 in the bottom member C, permit air to enter or leave the lower compartment N, as the diaphragm is flexed by the change of air pressure in the upper air compartment L.

The diameter of the disc valve E, is made considerably larger than the diameter of the water pipe A, so that the valve will act as a water spreader when the valve is open in addition to acting as a valve. The water from a water conduit P, enters the pipe A under pressure and strikes the underside of the disc valve E, when the latter is open to deflect the water horizontally and in an apron-like stream. The disc valve rim should extend about three quarters of an inch beyond the outlet end 10 of the pipe A, in order to effect a good spreading of the water. I do not wish, however, to be limited to any particular size of overhang of the valve E with respect to the pipe A.

No springs are needed to open or close the disc valve E. The water conduit P, leads to a supply of water under pressure, not shown, which is sufficient to open the valve when the air pressure against the diaphragm H, is reduced below that which is necessary to keep the valve closed. Water pressure opens the valve and air pressure closes the valve or determines how great the valve opening should be.

The space between the valve E and the bottom member C, is sufficient for an operator to gain access to the lock nut 11, when it is desired to loosen the nut and permit adjustment of the cap screw G, after which the lock nut can be tightened. The water-directing portion 1 of the support B, can be made large or small in arcuate area and thus control the lateral spread of the water. The structure of the device is simplified when the pipe A, support B, and bottom member C, are made in a single casting. Although the invention is directed primarily to a water sprinkler valve, the device could handle liquids other than water if desired.

I claim:
1. A device of the type described comprising a vertical fluid conveying outlet pipe communicating with a source of fluid supply under pressure, the outlet end of the pipe lying in a horizontal plane and opening into the atmosphere; an air-controlled device; a support interconnecting the air-controlled device with the pipe and spacing it above the outlet end of the pipe; said air-controlled device including a compartment for receiving air from a source of air supply under pressure, one wall of the compartment constituting a diaphragm that is flexed according to the air pressure in the compartment; a horizontally disposed disc valve having a central supporting shank mounted for vertical movement in the air control device and along the vertical axis of the pipe; the diameter of the disc valve being larger than that of the pipe so that when the fluid in the pipe lifts the valve from a closed position of contacting with the discharge end of the pipe to an open position, the disc valve will function as a fluid spreader and will cause the fluid to flow in an apron-like stream from the pipe and into the atmosphere; and a valve for controlling the flow of air under pressure into the compartment; whereby when a flow of air under pressure into the compartment to exert a force on the diaphragm and disc valve to close the valve is greater than the fluid pressure in the pipe to open the valve, the valve will close and will stop the fluid flowing from the pipe; and when a lesser flow of air into the compartment to exert a lesser force on the diaphragm for closing the disc valve than is exerted by said fluid pressure for opening the valve, the valve will open and will act as a fluid spreader for the fluid flowing from the pipe into the atmosphere; and in which the support that interconnects the air-controlled device with the fluid outlet pipe has a vertical portion which is arcuate in horizontal cross section and will extend part way around a circle and will act as a deflector for any fluid striking it and will thus limit the angular spread of the apron-like stream of fluid issuing into the atmosphere from between the discharge end of the outlet pipe and the undersurface of the disc valve.

2. A device of the type described comprising a vertical fluid conveying outlet pipe communicating with a source of fluid supply under pressure, the outlet end of the pipe lying in a horizontal plane and opening into the atmosphere; an air-controlled device; a support interconnecting the air-controlled device with the pipe and spacing it above the outlet end of the pipe; said air-controlled device including a compartment for receiving air from a source of air supply under pressure, one wall of the compartment constituting a diaphragm that is flexed according to the air pressure in the compartment; a horizontally disposed disc valve having a central supporting shank mounted for vertical movement in the air control device and along the vertical axis of the pipe; the diameter of the disc valve being larger than that of the pipe so that when the fluid in the pipe lifts the valve from a closed position of contacting with the discharge end of the pipe to an open position, the disc valve will function as a fluid spreader and will cause the fluid to flow in an apron-like stream from the pipe and into the atmosphere; and a valve for controlling the flow of air under pressure into the compartment; whereby when a flow of air under pressure into the compartment to exert a force on the diaphragm and disc valve to close the valve in greater than the fluid pressure in the pipe to open the valve, the valve will close and will stop the fluid flowing from the pipe; and when a lesser flow of air into the compartment to exert a less force on the diaphragm for closing the disc valve than is exerted by said fluid pressure for opening the valve, the valve will open and will act as a fluid spreader for the fluid flowing from the pipe into the atmosphere; and in which the air-controlled device has a disc-shaped header bearing against the underside of the diaphragm; said header having a central cylindrical member integral therewith and depending therefrom; the bore of the cylindrical member being threaded; said air-controlled device having a central vertical bore in which the cylindrical member can move; said central supporting shank for the disc valve being threaded and adjustably received in the cylindrical member; and a lock nut mounted on the shank and bearing against the bottom of the cylindrical member for securing the shank in adjusted position.

References Cited in the file of this patent
UNITED STATES PATENTS

| | | |
|---|---|---|
| 813,008 | Kimes | Feb. 20, 1906 |
| 1,143,293 | Luehrs | June 15, 1915 |
| 1,154,707 | Luehrs | Sept. 28, 1915 |
| 3,038,691 | Awerkamp | June 12, 1962 |